March 13, 1962     J. O. TRIMBLE     3,024,506
MOLD AND METHOD OF MAKING METAL-FACED FOUNDRY PATTERNS THEREON
Filed July 31, 1959     2 Sheets-Sheet 1

INVENTOR.
John O. Trimble
BY Karl L. Schiff
AGENT

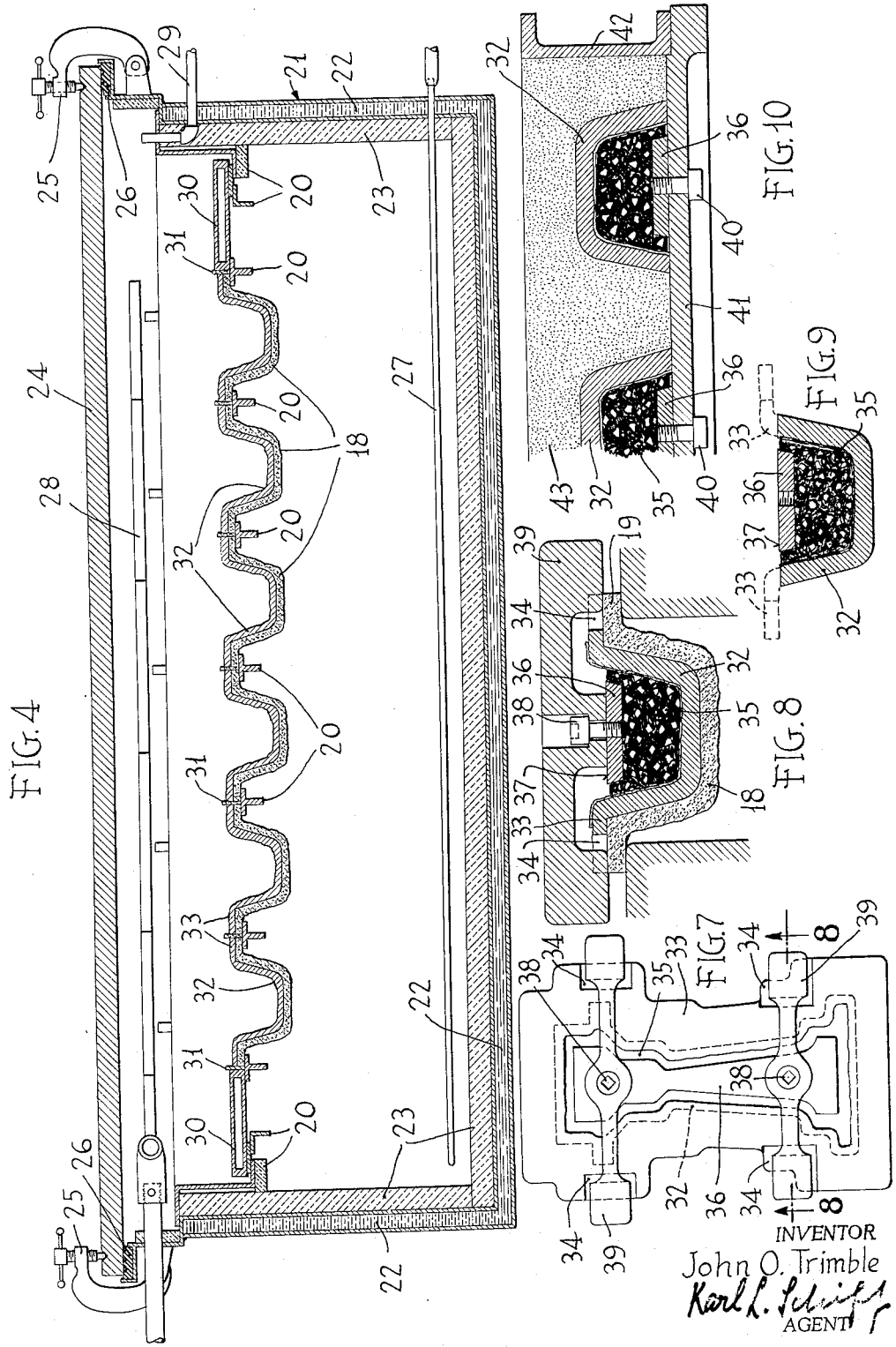

_United States Patent Office_

3,024,506
Patented Mar. 13, 1962

3,024,506
MOLD AND METHOD OF MAKING METAL-FACED FOUNDRY PATTERNS THEREON
John O. Trimble, Havertown, Pa., assignor to The Budd Company, Philadelphia, Pa., a corporation of Pennsylvania
Filed July 31, 1959, Ser. No. 830,812
6 Claims. (Cl. 22—113)

The invention relates to a foundry pattern having a facing obtained by gas deposition of a metal onto a mold. More specifically, the invention relates to a material of which the mold or its working surface consists and to a method of making this mold and of forming the pattern thereon.

Though primarily concerned with foundry patterns, the invention or certain aspects thereof is also applicable to other articles having a metal-facing obtained by gas plating, particularly to such articles requiring great dimensional accuracy and stability.

Foundry patterns are nowadays mostly obtained by producing a casting having approximately the shape of but slightly larger dimensions than the ultimate pattern, the casting being subsequently laboriously machined so as to give it the exact final desired shape and dimensions. This is a very expensive, time consuming and intricate procedure, requiring the work of highly skilled craftsmen.

Among the objects of the invention are a novel method of and means for making the indicated type of foundry patterns and other articles by which the time required for producing them is greatly reduced, by which machining is eliminated or reduced to a minimum, by which great dimensional accuracy and stability are achieved independent of the skill and the diligence of the workmen, and by which the ultimate costs are greatly reduced.

The aforesaid and other objects and advantages are achieved by gas-plating the metal-facing of the pattern or article onto a mold and by making such mold of a material being originally liquid or moldable but subsequently hardening and having in its hardened state a thermal co-efficient of expansion substantially equalling or compatible with the thermal expansion of the metal to be gas-deposited onto the mold. The material preferably consists of a mixture of several ingredients having different co-efficients of thermal expansion and the ratio between the different ingredients being such that the resultant thermal co-efficient of expansion equals or approaches the thermal co-efficient of expansion of the metal to be gas-deposited onto the mold made of such material.

The aforesaid material advantageously comprises a binder and a comminuted or powdered filler, the thermal expansion of the binder being less and the thermal expansion of the filler being greater than the thermal expansion of the metal to be gas-deposited, and the ratio of binder and filler being such that the resultant thermal expansion of the mixture substantially equals the thermal expansion of said metal. The use of such mixture has the further advantage that the filler reduces the amount of change in volume which may occur to the binder upon hardening.

More specifically the invention resides in the use of a mixture comprising plaster-of-Paris as a binder and a powder as a filler, the filler having a greater thermal co-efficient of expansion than the plaster and counter-acting the characteristic of plaster-of-Paris to expand during hardening.

According to a still further feature of the invention, metal powder is used as filling ingredient. Metal increases the thermal conductivity of the mold, which is highly desirable because the mold has to be kept in a certain elevated temperature range during the gas-plating. Stainless steel or iron powder, such of the austenitic "410" type, are particularly suitable because they have a high thermal expansion and are not affected by the temperature incident to and the gas mixture used for the gas-plating.

It will be understood that the advantages of a mold having the above outlined characteristics are that the mold, upon heating for gas-plating or otherwise depositing heated metal in dispersed condition, expands beyond the dimensions of the model and that the metal shell deposited onto the mold at such temperature will have the same over-size dimensions, but that, upon completion of the depositing and cooling of mold and metal shell, both will return together to the same surface dimensions of the model on which the mold was formed. The equal contraction of mold and metal shell thereon also avoids distortion incident to the cooling.

The above outlined and further features, details, objects, and advantages of the invention are disclosed in or will be more clearly understood from the embodiment illustrated in the attached drawing and described in the following.

In the drawing:

FIG. 4 is a section through a gas-plating chamber with a plurality of gas-plated molds supported therein;

FIG. 7 is a small scale bottom view of an individual mold and pattern with a mounting plate and means for accurately inserting the latter;

FIG. 8 is a section on a larger scale along line 8—8 of FIG. 7;

FIG. 9 is a section corresponding to FIG. 8 illustrating the completion of the pattern by removal of marginal portions thereof; and FIG. 10 is a fragmentary section through several of the patterns shown in FIG. 9 mounted on a common base and embedded in foundry sand.

Figure 1:
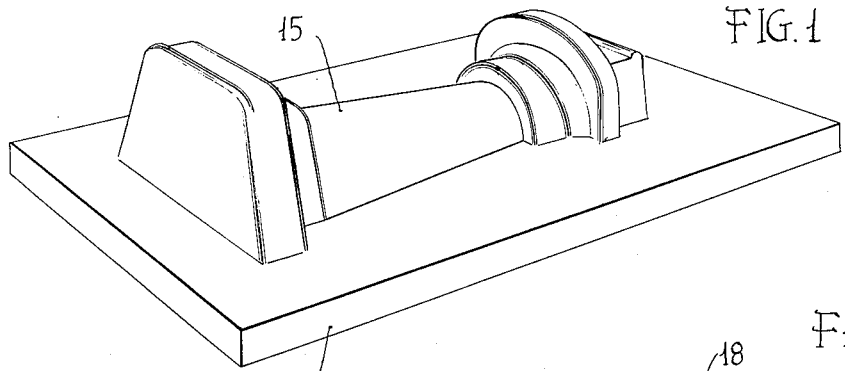
FIG. 1 is a perspective of a wooden model mounted on a base plate and having the exact shape and dimensions of a foundry pattern to be obtained.
Figure 2:
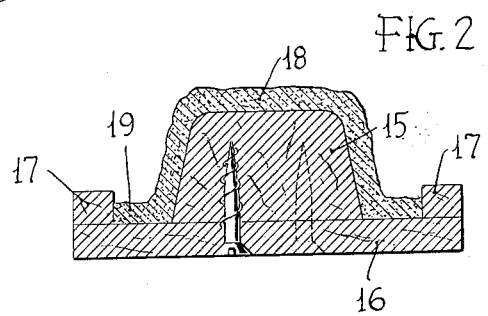
FIGS. 2 and 3 are, respectively, a transverse section and a longitudinal section through the model and through a mold cast thereon.
Figure 3:
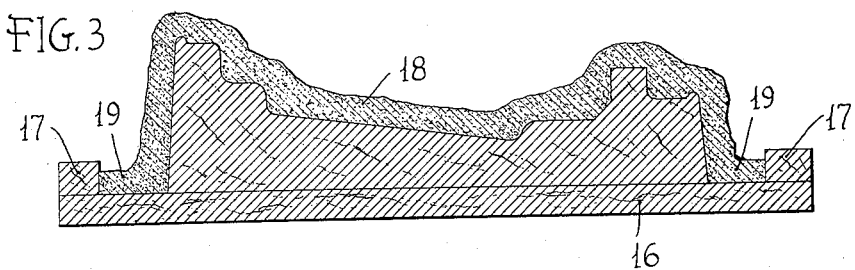
Figure 5:
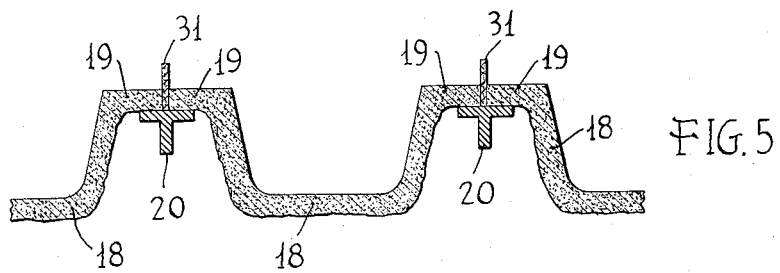
FIG. 5 is a fragmentary section, at a larger scale than FIG. 4, through several adjoining molds and their supports in the gas chamber, prior to the gas-plating.
Figure 6:
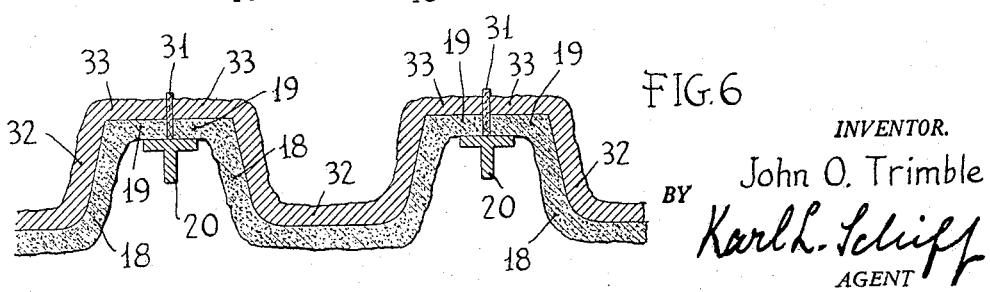
FIG. 6 is a section corresponding to FIG. 5, after the gas-plating.

At the start, a model 15 is formed to the exact surface configuration and dimensions to be given to a pattern and is mounted on a base plate 16. Outwardly projecting strips or projections 17 are provided on base 16 at a short distance from model 15. Model 15, base plate 16, and strips 17 may consist of wood.

Model 15 and the part of base 16 between the model 15 and strips 17 are now embedded in plaster-of-Paris mixed with metal powder so as to form a negative replica 18 and a peripheral margin 19 of model 15 and adjoining base 16. In the event that nickel is to be deposited by gas-plating on mold 18, a favorable mixture and ratio are, one part of plaster-of-Paris to three parts of "410" type austenitic stainless steel powder, the latter comprising 80% passing 325 mesh and 20% passing 200 mesh. The chemical composition of type 410 Stainless Steel (also called USS 12) is listed as follows:

|  | Maximum percent |
|---|---|
| Carbon | 0.15 |
| Manganese | 1.00 |
| Phosphorus | 0.04 |
| Sulphur | 0.03 |
| Silicon | 1.00 |
| Chromium | 11.50/13.50 |

(Balance iron)

The wall thickness of mold 18 depends on the size of the model and must be such as to give it sufficient strength between supports in the gas-plating chamber and so as to carry the gas-deposited metal until the latter gets thick enough for adding to the supporting strength. In general a wall thickness of about one inch is satisfactory.

Any number of molds 18, either being obtained from the same model 15 or from differently shaped models, are, after hardening and drying, placed on supports 20 by their laterally projecting marginal portions 19. The supports 20 are arranged in a gas-plating chamber 21 having water-cooled outer walls 22, an insulating inner lining 23, a removable lid 24 held by clamps 25 and resting on gas-tight seals 26, electric heating rods 27 arranged beneath supports 20 and molds 18, a manifold 28 for admission of plating gas, such as a mixture of nickel carbonyl and carbon dioxide, and exhaust pipes 29 for waste gas. The spaces between the molds 18 and the walls 22 are masked off by insulating fillers 30 and the individual molds 18 are separated from each other and from the masking members 30 by separators 31.

The heating rods 27 will heat the molds 18, so that upon admission of metal carbonyl through manifold 28, a metal deposit 32/33 will be formed on the exposed upper surface of the molds 18 and their margins 19. The depositing procedure is terminated as soon as the desired thickness of the metal deposit is reached.

It must be noted that the diagrammatic drawing should not be understood as showing the mostly prevailing ratio between the thickness of mold 18/19 and metal deposit 32/33. Whereas the thickness of the mold may be about one inch, the thickness of the gas deposit will mostly be between 1/8 to 1/4 inch only.

After completion of the metal deposit, the individual molds 18/19 with the metal shells 32/33 thereon, are taken out. Recesses 34 are cut out of the marginal portions 33 to the exact level of the surface of the marginal portions 19 of the molds 18. The metal shells 33 are then provided with a plastic or other backing 35, for instance in the manner disclosed in applicant's earlier application, Ser. No. 504,761 for Article of Plastic Especially Forming Die, and Method of Making It, filed April 29, 1955, and a threaded backing and mounting plate 36 is embedded in the backing 35 with its upper surface 37 in exactly the same plane as the surface of the marginal portions 19 of mold 18. During the embedding, plate 36 is held through bolts 38 by mounting gages 39, the latter supporting on the marginal portions 19 in the recesses 34.

After backing 35 with plate 36 is firmly secured in metal shell 32, bolts 38 and gages 39 are removed, mold 18/19 and shell 32/33 are separated, and the marginal portions 33 of shell 32 are machined off down to the exact level of the exposed surface 37 of backing plate 36.

The surface of pattern 32 is an exact replica of the surface of model 15 and its supporting underside is at exactly the same level as the top surface of mounting plate 16 relative to model 15.

Any desired number of patterns 32 are now mounted by bolts 40 entering backing plates 36, on a plate 41, the latter receiving a foundry flask 42 thereon, whereupon one half of a multiple mold is formed by filling flask 42 with foundry sand 43 in the manner customary in the metal casting art.

It will be understood that the material for making the mold, on which the metal is to be gas-deposited, should originally be liquid or moldable at ambient temperatures and should solidify or harden without appreciable change in dimension. Moreover, the material of the mold, when hardened, must be resistant to the elevated temperatures required for gas-plating and must be free of distortions upon being brought and kept at such temperatures. The surface texture of the mold can be selected within certain limits by the grain size of the filler ingredient, the smaller the grains the finer the texture.

The invention is not restricted to the illustrated and described embodiment and its details but is susceptible to modifications and adaptations for specific purposes and conditions, which will easily occur to those skilled in the art.

What is claimed is:

1. The method of making a pattern shell by decomposing a metal carbonyl gas and depositing the metal on a mold at elevated temperatures, which comprises, forming on a pattern a mold from a mixture of metal powder and a set hardening non-metallic binder in which the metal powder has a greater coefficient of expansion than the deposited metal and in which the non-metallic binder has a smaller coefficient of expansion than the deposited metal and the mixture being in such proportions that the mold has approximately the same coefficient of expansion as the metal to be deposited; placing the mold in a chamber and heating it to the temperature at which metal is deposited from the metal carbonyl gas, and then introducing metal carbonyl gas into said chamber with said heated mold to cause metal to be deposited from the metal carbonyl gas to form a shell on said mold.

2. The method as set forth in claim 1 in which nickel is the metal deposited from carbonyl gas, the mold being made of austenitic stainless steel powder and plaster of Paris in the approximate proportions one part plaster of Paris and three parts stainless steel powder.

3. The method as set forth in claim 1, which further includes the step of removing the deposited metal shell after cooling, backing it with a settable plastic filling, and separating the mold from the shell.

4. The method of making a shell from a thermal conductive mold by the gas deposit of metal at elevated temperatures, comprising the steps of: forming on a pattern a mold comprising a mixture of metal powder and a set hardening non-metallic binder in which the metal powder has a greater coefficient of expansion than the metal to be deposited and in which the non-metallic binder has a smaller coefficient of expansion than the metal to be deposited and the mixture being in such proportions that the mold has approximately the same coefficient of expansion as the metal to be deposited, heating the mold to the temperature at which the metal is to be deposited, and gas depositing metal in the heated mold to form a shell on said mold having dimensions substantially the same as the pattern.

5. A thermal conductive mold for deposit of nickel from the decomposition of a metal carbonyl gas at elevated temperatures, comprising a hardened shell composed of one part of plaster of Paris combined with three parts of "410" type austenitic stainless steel powder, the stainless steel powder being composed of 80% passing a screen of 325 mesh per inch and 20% passing 200 mesh per inch, the composite mold shell material having substantially the same coefficient of expansion as the nickel to be deposited.

6. The method of making a hot-deposited metallic shell on a mold to produce a completed shell which will have substantially the same dimensions at normal temperature conditions as the original mold in its normal temperature conditions and be substantially free from distorting stresses, which comprises, forming on a pattern a mold comprising a mixture of metal powder and a set-hardening non-metallic refractory binder in which the metal powder has a greater coefficient of expansion than the metallic shell to be deposited, the non-metallic binder has a smaller coefficient of expansion than that of the shell, and the mixture being in such proportions that the mold has approximately the same coefficient of expansion as the metallic shell to be deposited over the range of temperatures between that of metal deposit and the cooled state, heating the mold to the temperature at which the metallic shell is to be deposited, depositing heated metal in dispersed condition on the mold to form a shell, cooling the shell and mold, and removing the shell from the mold.

References Cited in the file of this patent

UNITED STATES PATENTS

| | | |
|---|---|---|
| 2,394,394 | Miller | Feb. 5, 1946 |
| 2,716,791 | Schellens | Sept. 6, 1955 |
| 2,753,800 | Pawlyk et al. | July 10, 1956 |

FOREIGN PATENTS

| | | |
|---|---|---|
| 631,751 | Germany | June 26, 1936 |
| 646,223 | Great Britain | Nov. 15, 1950 |
| 806,468 | Germany | June 14, 1951 |
| 1,109,752 | France | Sept. 28, 1955 |
| 814,473 | Great Britain | June 3, 1959 |